United States Patent [19]

Nishigaya et al.

[11] Patent Number: 5,594,902
[45] Date of Patent: Jan. 14, 1997

[54] CUSTOM SERVICE CONTROL SYSTEM

[75] Inventors: Takashi Nishigaya; Akira Hakata; Naoto Itoh; Toshihiro Ide; Masahiro Hirayama, all of Kawasaki, Japan

[73] Assignee: Fujitsu Limited, Kawasaki, Japan

[21] Appl. No.: 286,910

[22] Filed: Aug. 8, 1994

Related U.S. Application Data

[63] Continuation of Ser. No. 957,387, Oct. 7, 1992, abandoned.

[30] Foreign Application Priority Data

Oct. 9, 1991 [JP] Japan ................................ 3-261682

[51] Int. Cl.$^6$ ................................................ G06F 9/00
[52] U.S. Cl. ................................. 395/672; 395/680
[58] Field of Search ........................... 395/650, 700, 395/600

[56] References Cited

U.S. PATENT DOCUMENTS

| | | | |
|---|---|---|---|
| 4,965,742 | 10/1990 | Skeirik | 364/191 |
| 4,999,833 | 3/1991 | Lee | 370/94.1 |
| 5,058,043 | 10/1991 | Skeirik | 364/550 |
| 5,063,522 | 11/1991 | Winters | 395/51 |
| 5,175,800 | 12/1992 | Galis et al. | 395/51 |

FOREIGN PATENT DOCUMENTS

| | | |
|---|---|---|
| 62-245361 | 10/1987 | Japan . |
| 63-85855 | 4/1988 | Japan . |
| 2-224169 | 9/1990 | Japan . |

*Primary Examiner*—Kevin A. Kriess
*Attorney, Agent, or Firm*—Armstrong, Westerman, Hattori, McLeland & Naughton

[57] ABSTRACT

In a custom service control system connected to a communication system including a plurality of user terminals and an exchange, a first memory stores service management processes respectively provided for the user terminals. A second memory stores a plurality of service processes respectively providing communications services. The service management processes includes pieces of custom data showing service processes respectively usable by the user terminals. A control unit selects service processes in response to requests from the user terminals in accordance with the service management processes.

6 Claims, 12 Drawing Sheets

| SERVICE INDICATION DATA | | | |
|---|---|---|---|
| TIME RANGE | CALLING USER | PRESENT/ABSENT | SERVICE |
| 12:00~1:00 | — | ABSENT | VOICE MAIL |
| 1:00~4:00 | D | PRESENT | REJECT |
| ⋮ | ⋮ | ⋮ | ⋮ |

(B)

| SCHEDULE DATA | |
|---|---|
| TIME RANGE | PLACE |
| 10:00~12:00 | MEETING ROOM |
| 12:00~1:00 | CAFETERIA |
| 1:00~4:00 | DESK |

(C)

- RELAY SERVICE IS CARRIED OUT FOR IMPORTANT CALLERS
- USER A IS IMPORTANT USER
- USER C IS ORDINARY USER
- RECEIVE BY MAIL DEVICE WHEN CALLED USERS ARE BUSY
- USERS IN MEETING ARE BUSY

- INTERRUPT REQUEST FROM USER IN REJECTION SERVICE REGISTRATION IN COMMUNICATION

⇩

VOICE MAIL SERVICE

⋮

(B)

| SUBJECT MATTER | CALLING USER | RELAYED USERS |
|---|---|---|
| UNIX | — | A, C |
| PATENT | — | C |
| ⋮ | ⋮ | ⋮ |

(C)

| SECTION | USER |
|---|---|
| LANGUAGE | USER |
| SPECIALITY | USER |
| UNIX | A, B, C, D |
| DISTRIBUTION PROCESSING | C, D, E |
| ISDN | F, G |

(D)

- TERMINATE CALL AT USER WHO ENDS COMMUNICATIONS LATEST IN SAME SECTION

⇩

SEND REQUEST TO CHANGE DESTINATION

| USER | STATE | QUEUE REGISTRATION MODE |
|---|---|---|
| C | S 1 | LEADING END OF QUEUE |
| D | S 2 | BY FIFO |
| DIRECT MAIL | S 3 | TRAILING END OF QUEUE |

(B)

- IMPORTANT CALLER IS REGISTERED AT LEADING END OF QUEUE

- USER A IS IMPORTANT CALLER

- CAMP-ON REGISTRATION IS RELEASED AFTER 30 MINUTES

⋮

CUSTOM SERVICE CONTROL SYSTEM

This application is a continuation of application Ser. No. 07/957,387 filed Oct. 7, 1992, now abandoned.

BACKGROUND OF THE INVENTION

1. Field of the Invention

The present invention relates to a custom service control system which provides users with various communications services.

2. Description of the Prior Art

Many users who utilize a communications system have different service requests based on various environments. Hence, it is required that the communications system is capable of providing the users with the respective communications services.

In a communications system in which a plurality of users are connected to an exchange and user-to-user communication takes place, there are provided not only communications services for connecting the users to each other but also advanced communications services, such as camp-on services and called-side accounting services. The users register the used communications services beforehand. In response to receipt of a communication service execution request from a user, it is determined whether or not the received request is executable by referring to the registered communications services for the present user. Generally, pieces of custom data related to a plurality of users are managed by a service management process. When some of the users which utilizing the same service management process concurrently generate requests for registration of custom data or execution of services, the service management process executes the requests one by one in the order of occurrence of the requests.

However, the conventional communications system allows only a small amount of data to be customized due to limitations regarding the processing speed and the storage capacity of the computer used in the communications system. Hence, the conventional communications system cannot satisfy all the requests of the users. A complex service program is needed to provide the users with fine services, and leads to a heavy development load on the program developers. Further, a complicated registration procedure for registering custom data by the users is needed.

SUMMARY OF THE INVENTION

It is a general object of the present invention to provide a custom service system in which the above disadvantages are eliminated.

A more specific object of the present invention is to provide a custom service system capable of providing the users with fine communications services.

The above objects of the present invention are achieved by a custom service control system connected to a communication system including a plurality of user terminals and an exchange, the custom service control system comprising: first memory means for storing service management processes respectively provided for the user terminals; second memory means for storing a plurality of service processes respectively providing communications services, the service management processes comprising pieces of custom data showing service processes respectively usable by the user terminals; and control means, coupled to the first and second memory means, for selecting the service processes in response to requests from the user terminals in accordance with the service management processes.

BRIEF DESCRIPTION OF THE DRAWINGS

Other objects, features and advantages of the present invention will become more apparent from the following detailed description when read in conjunction with the accompanying drawings, in which:

FIG. 9 is a diagram showing custom data and a knowledge base;

FIG. 10 is a diagram showing custom data and a knowledge base;

FIG. 11 is a diagram showing custom data and a knowledge base; and

DESCRIPTION OF THE PREFERRED EMBODIMENT

Figure 1:
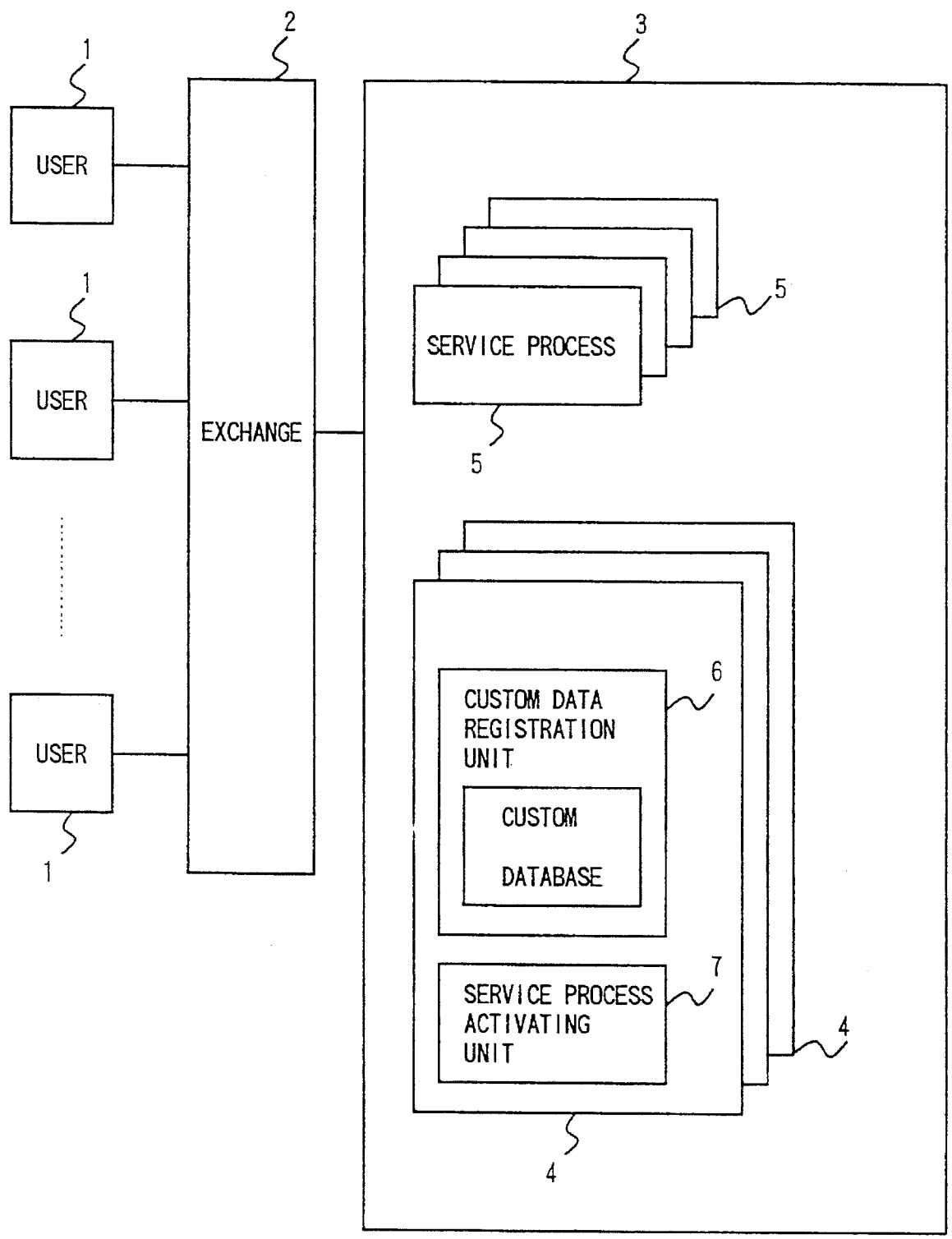
FIG. 1 is a block diagram showing an overview of a custom service control system according to an embodiment of the present invention.

FIG. 1 shows an overview of a custom service control system according to an embodiment of the present invention. The custom service control system shown in FIG. 1 is achieved by a computer 3 and connected to a communications system including an exchange 2 to which a plurality of users 1 are connected. The computer 3 includes service management processes 4 provided for the respective users, and a plurality of service processes 5 activated by the service management processes 4. Each of the service management processes 4 comprises a custom data registration unit 6 for registering custom data from the corresponding user, and a service process activating unit 7 for activating the service process 5. When custom data is registered, the custom data registration unit 6 detects any error in the custom data and interpolates to obtain complete custom data by referring to a knowledge base. Further, the custom data registration unit 6 operates the service management process provided for the user 1 which process generates a service request as well as the service management processes provided for the other users, and selects a service process providing a suitable service by referring to the knowledge base on the basis of the custom data registered in the custom data registration unit 6.

The custom data registration unit 6 comprises a custom database, a knowledge base (not shown in FIG. 1) for supporting the registration, and a knowledge base (not shown in FIG. 1) for interpolating custom data. When custom data is registered by the user 1, it is determined whether or not registered custom data is appropriate by referring to the knowledge base for supporting registration. When it is determined that the registered custom data is not appropriate, an interpolation process is carried out by referring to the knowledge base for interpolating custom data, and appropriate custom data obtained by the interpolation process is registered in the custom database. When the user 1 specifies a service which has not been registered in the custom database, a suitable service process is selected by referring to the knowledge base for interpolating custom data and is then activated.

Figure 2:
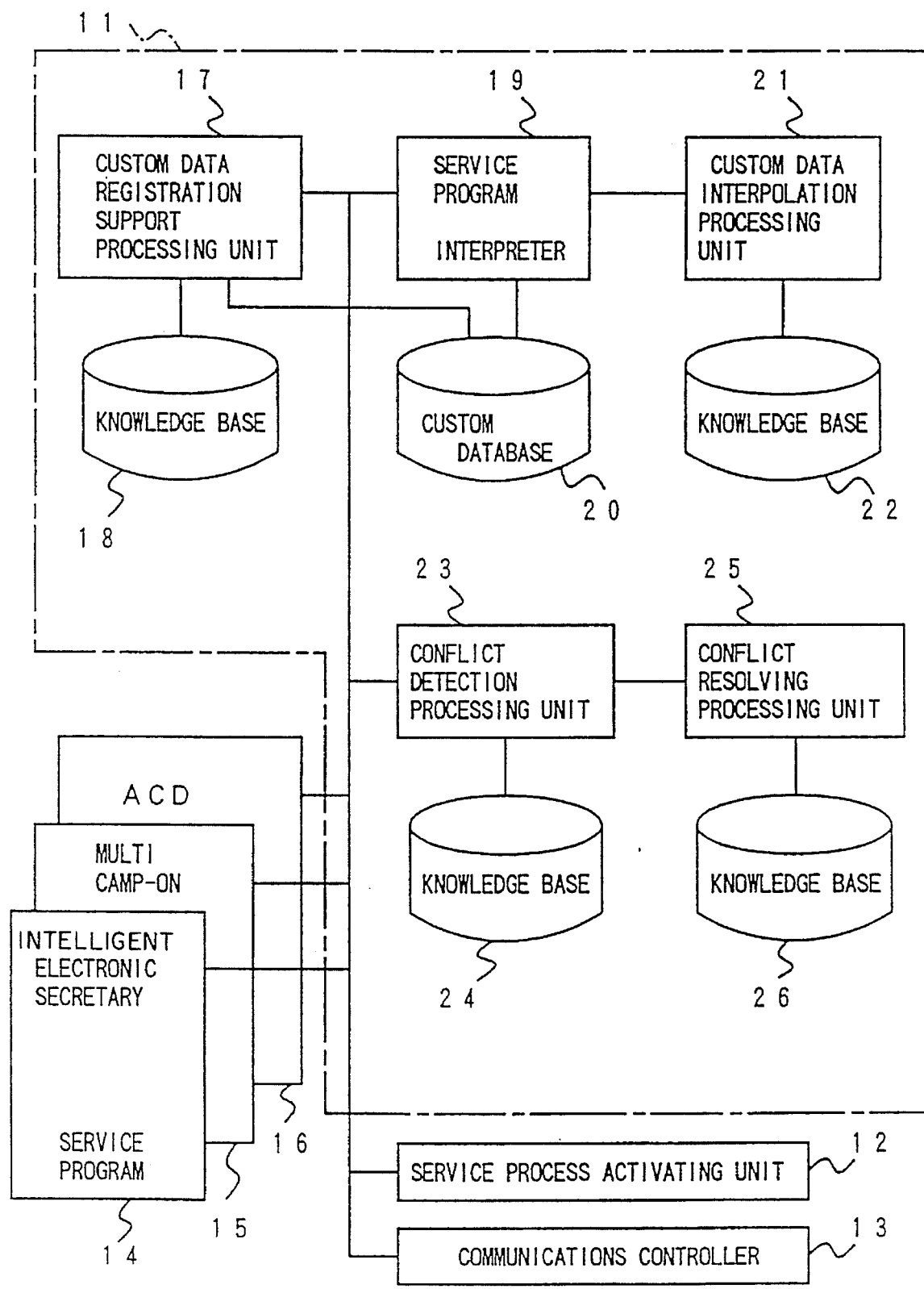
FIG. 2 is a block diagram showing a service management process used in the custom service control system shown in FIG. 1.

FIG. 2 is a block diagram showing one of the service management processes shown in FIG. 1. The service management process shown in FIG. 2 comprises a custom data registration unit 11, a service process activating unit 12, a communications controller 13, an intelligent electronic secretary service program 14, a multi camp-on service program 15, and an ACD (Automatic Call Distribution) service program 16. The custom data registration unit 11 comprises a custom data registration support processing unit 17, a knowledge base 18 for supporting registration, a service program interpreter 19, a custom database 20, a custom data interpolation processing unit 21, a knowledge base 22 for interpolating custom data, a conflict detection processing unit 23, a knowledge base 24 for detecting a conflict between services, a conflict resolving processing unit 25, and a knowledge base 26 for resolving a conflict between services. The users 1 and the exchange 2 shown in FIG. 1 are omitted from FIG. 2.

One service management process is provided for one user. The custom data registration unit 11 detects an error in custom data requested to be registered by the user, and interpolates custom data to thereby generate complete custom data. When the user requests a service, the service management processes related to the other users are operated in parallel with the service management process related to the user of interest. Thereby, if there is an inconsistency in the custom data, the inconsistency is resolved and an optimum service can be selected.

Figure 3:
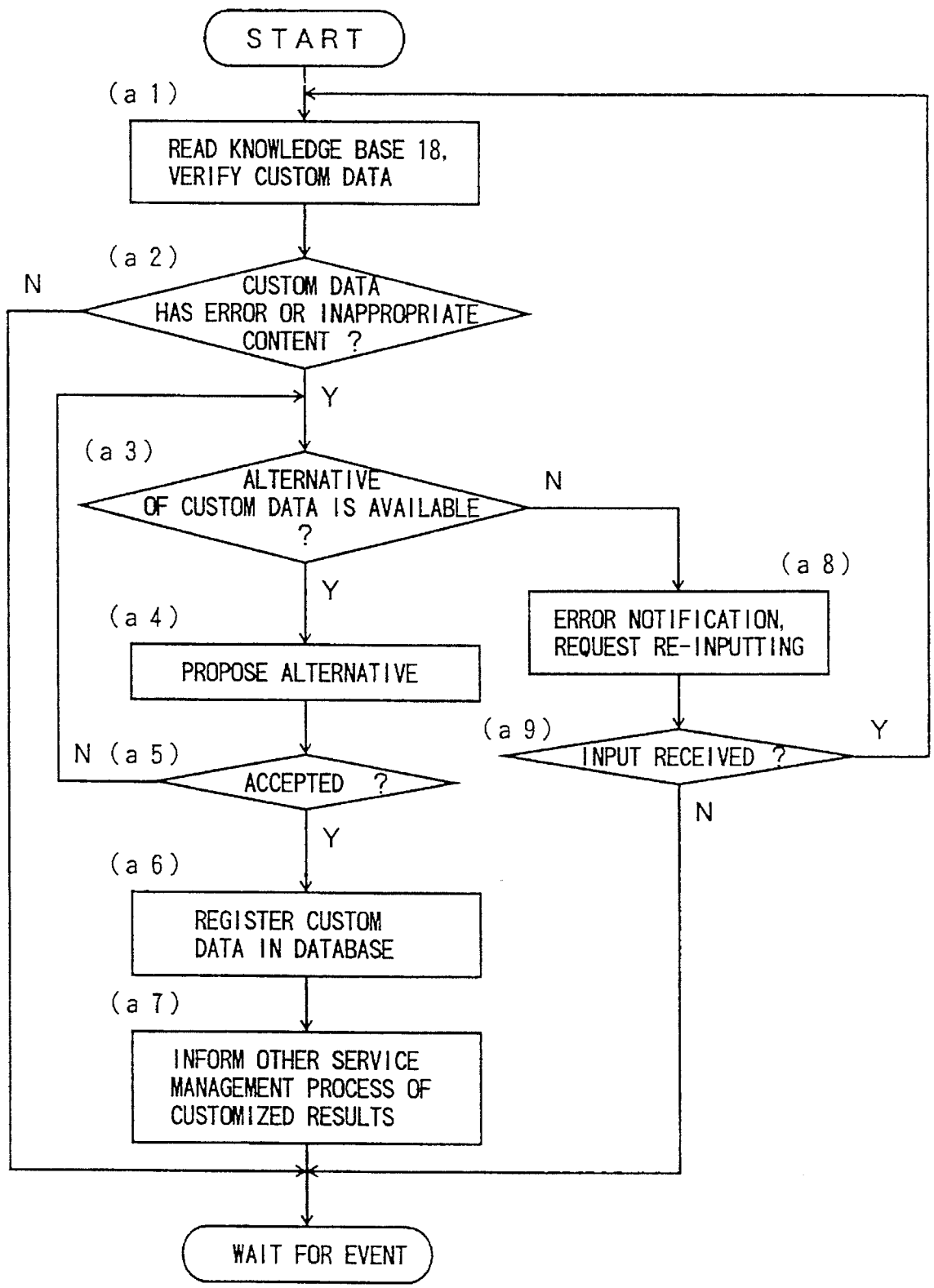
FIG. 3 is a flowchart of a process for registering custom data in a database.

FIG. 3 is a flowchart of a process for registering custom data according to the embodiment of the present invention. The custom data registration process shown in FIG. 3 includes steps a1–a9. At the commencement of the registration process, the user inputs custom data to the system, and the custom data registration support processing unit 17 accesses the knowledge base 18 for supporting the registration, and discerns whether or not the input custom data has a bad influence upon the network and/or other users (step a1). Next, the processing unit 17 determines whether or not the input custom data has an error and determines whether or not the input custom data has an inappropriate content (step a2). When it is determined that the input custom data does not have any error and is appropriate data, the input custom data is registered in the custom database 20 under the control of the service program interpreter 19. Then, the processing unit 17 waits for the next event.

When it is determined that the input custom data has an error or is inappropriate data, the processing unit 17 activates the custom data interpolation processing unit 21, which refers to the knowledge base 22 for interpolating custom data and determines whether or not an alternative to the input custom data is available (step a3). When an alternative to the input custom data is available, it is proposed to the user (step a4). Then, it is determined whether or not the alternative custom data has been accepted by the user (step a5). If the user does not accept the alternative custom data, the processing unit 21 searches for another alternative to of the custom data (step a4). If the user accepts the alternative custom data, it is registered in the custom database 20 under the control of the service program interpreter 19 (step a6). Further, the service management processes related to the above registration are informed of the registration of the custom data (step a7). Then, the custom data registration unit 11 waits for the next event.

If an alternative to the input custom data is not available, the user is informed of the occurrence of error and is provided with an instruction to input custom data again (step a8). If custom data is input to the system again, the process returns to step a1. If custom data is not input, the registration process is not carried out, and the registration unit 11 waits for the next event.

In the above manner, even if the custom data input by the user is incomplete, it is possible for the custom data registration unit 11 to refer to the knowledge base 18 for supporting the registration process and register appropriate custom data in the custom database 20.

Figure 4:
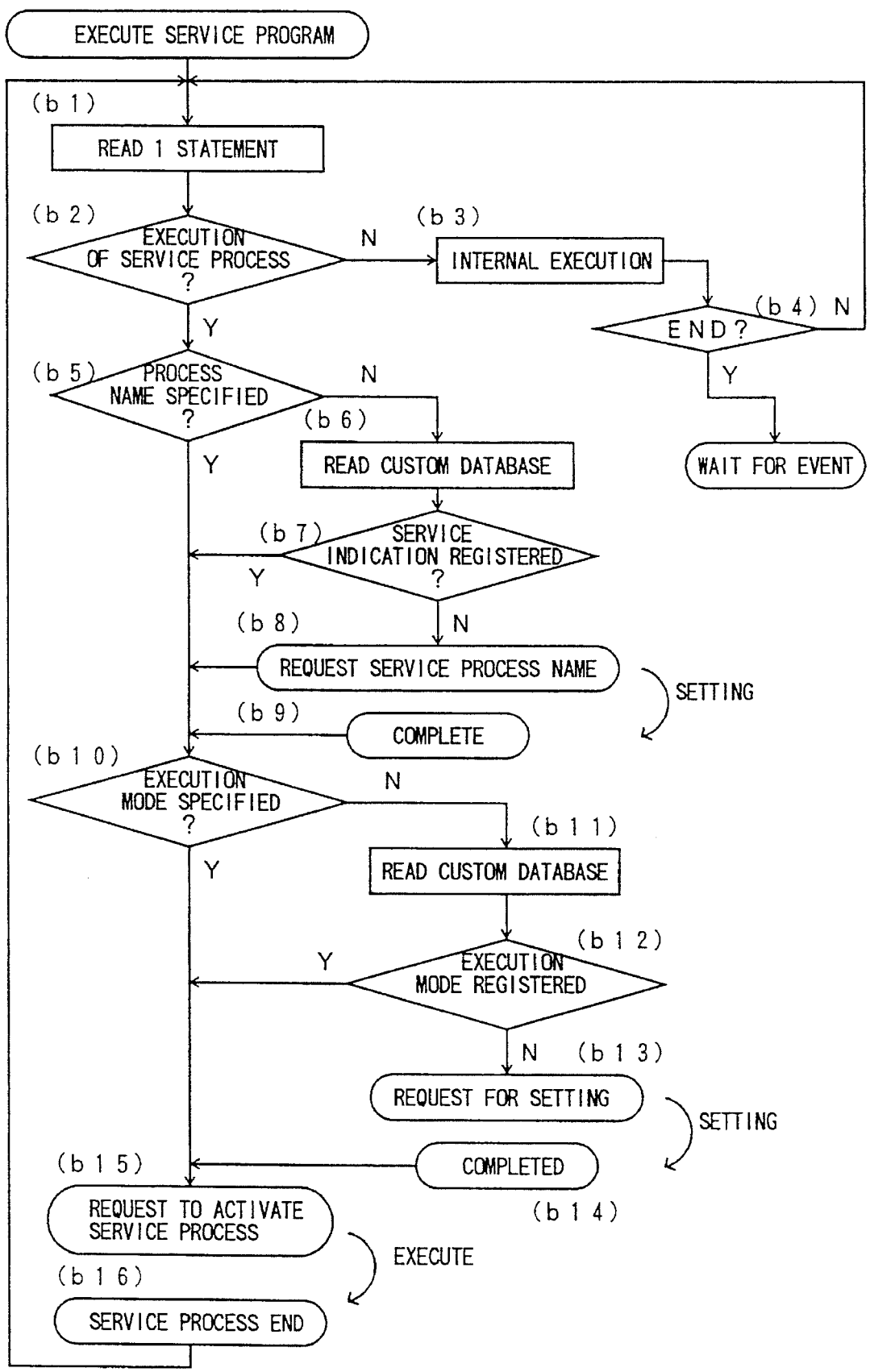
FIG. 4 is a flowchart of a process for requesting execution of a service program.

FIG. 4 is a flowchart executed when a service program execution request is generated. The aforementioned service program interpreter 19 interprets the contents of the service program execution request. The interpreter 19 reads one statement from the service program (step b1), and determines whether or not it means the execution of service process (step b2). When the read statement does not mean the execution of a service process, an internal execution by the service program takes place (step b3). Then the interpreter 19 determines whether or not the internal execution is completed (step b4). When the result of this determination is NO, the process returns to step b1. When the result of the step b4 determination is YES, the interpreter 19 waits for an event. When the read statement means the execution of service process, the interpreter 19 determines whether or not the service process name has been specified (step b5).

When the service process name is specified in the read statement, the interpreter 19 determines whether or not an execution mode (parameter) has been specified therein (step b10). When an execution mode has been specified in the statement, the interpreter 19 requests to activate the specified service process (step b15). Then the service process having the specified service process name is activated by the service process activating unit 12. When the execution of the service process is completed (step b16), the process returns to step b1.

When the service process name is not specified in the read statement, the interpreter reads the contents of the custom database 20 (step b6), and discerns whether or not a corresponding service indication has been registered (step b7). When the result of this determination is YES, step b10 is executed. When the determination result is NO, the interpreter 19 requests the custom data interpolation processing unit 21 to set the service process name (step b8). The custom data interpolation processing unit 21 refers to the knowledge base 22 for interpolating custom data, and executes the setting of the service process name. When the setting is completed (step b9), step b10 is executed.

When the execution mode has not been registered, the interpreter 20 reads the contents of the custom database 20 (step b11), and discerns whether or not a corresponding execution mode has been registered (step b12). When such a corresponding execution mode has been registered, the interpreter 19 executes step b15. When the result of the step b12 determination is NO, the interpreter 19 requests the custom data interpolation processing unit 21 to set the execution mode (step b13). The custom data interpolation processing unit 21 refers to the knowledge base 22 for interpolating custom data, and executes the setting of the execution mode. When the setting is completed (step b14), step b15 is executed. In this manner, even-if a service execution request which does not indicate the service process to be activated, the custom data interpolation processing unit 21 can select an optimum service by referring to the knowledge base 22 for interpolating custom data and to generate an appropriate activation or execution mode or activation parameter. Hence, it is possible to request the service process activating unit 12 to active the custom service.

Figure 5:
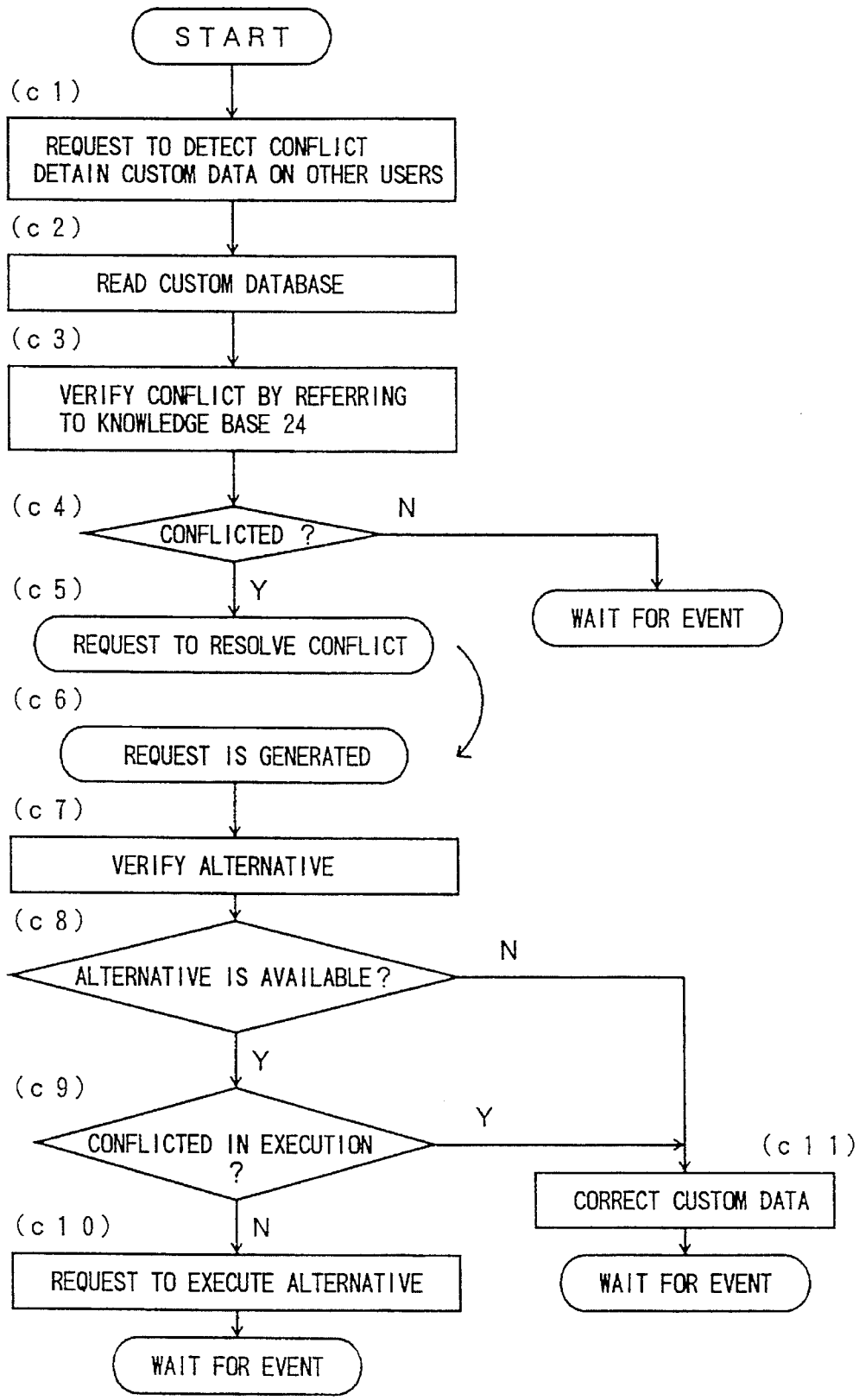
FIG. 5 is a flowchart of a process executed when a conflict between custom services occurs.

FIG. 5 is a flowchart of a process for handling a conflict between custom services. The service management processes are independently provided for the respective users, and therefore there is a possibility that a conflict between users may occur with respect to custom data registered by the users. The conflict detection processing unit 23 shown in FIG. 2 obtains custom data related to the other data in response to a request to detect a conflict (step c1), and reads its own custom database 20 (step c2). Then, the processing unit 23 verifies the conflict by referring to the knowledge base 24 for detecting a service conflict (step c3), and determines whether a conflict has occurred (step c4). When it is determined that no conflict has occurred, the processing unit 23 waits for the next event. When it is determined that a conflict has occurred, the processing unit 23 sends a conflict resolving process request to the conflict resolving processing unit 25 (step c5).

In response to a request to resolve a conflict (step c6), the processing unit 25 searches for an appropriate alternative by referring to the knowledge base 26 (step c7), and determines whether or not an appropriate alternative is available (step c8). When an alternative is available, the processing unit 25 sends a request to execute the alternative to the service process activating unit 12 (step c10), and waits for the next event. When no alternative is available or when the alternative cannot be executed at present, the processing unit 25 requests its own user or the other users to correct custom data (step c11), and waits for the next event.

Figure 6:
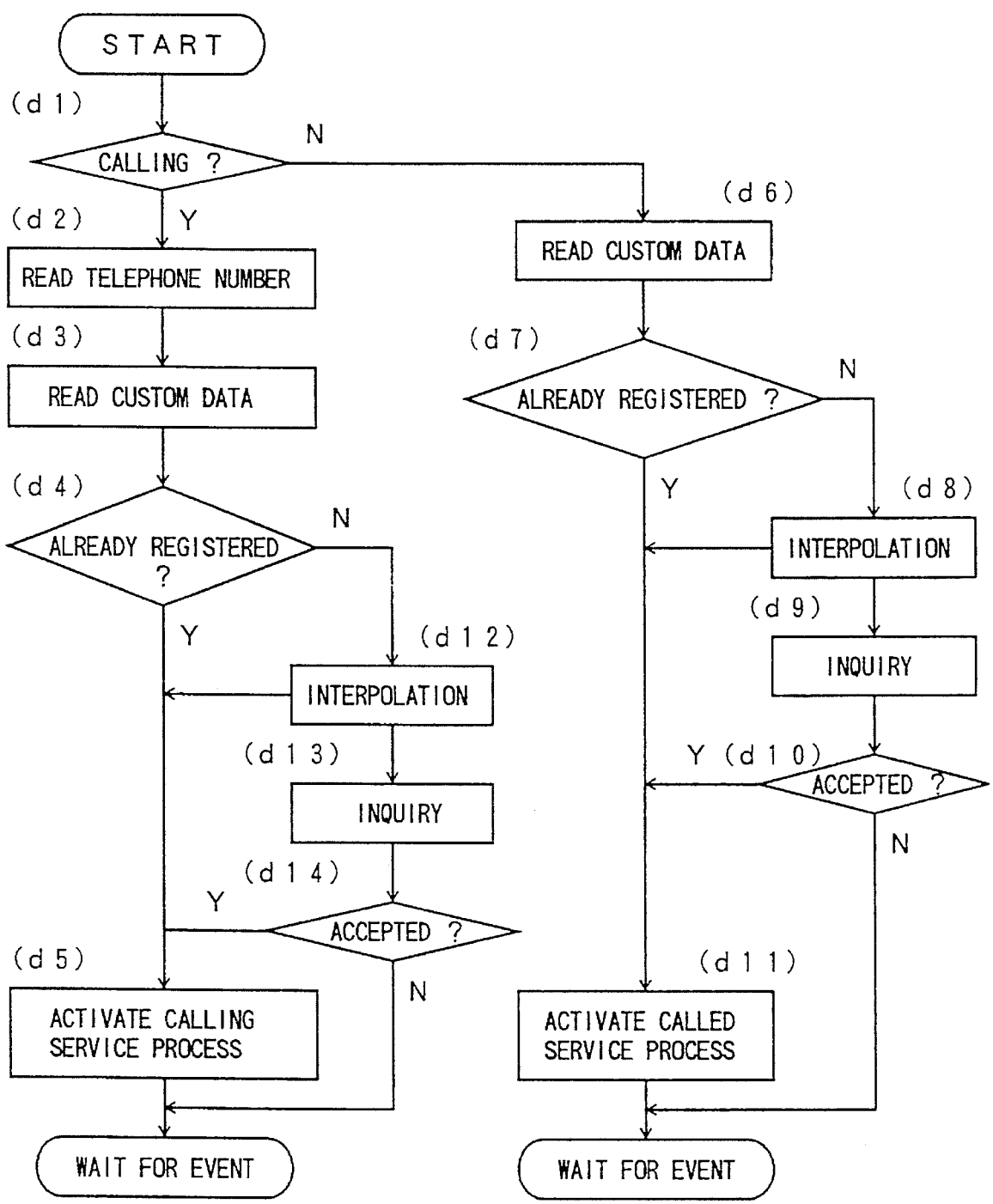
FIG. 6 is a flowchart of a program for realizing an intelligent electronic secretary system.

FIG. 6 is a flowchart showing the aforementioned intelligent electronic secretary system 14 (FIG. 2) according to the embodiment of the present invention. The intelligent electronic secretary system 14 provides services such as relaying of telephone calls. The following steps forms the service program 14. It is determined whether or not an outgoing call has been received (step d1). When the result of this determination is YES, the telephone number of the caller is read (step d2). Then, the service program interpreter 19 reads custom data from the custom database 20 (step d3), and determines whether or not the corresponding service indication has been registered (step d4). When the result of this determination is YES, a calling service program based on the service indication is activated (step d5). When the service indication has not been registered, the custom data interpolation processing unit 21 interpolates custom data by referring to the knowledge base 22 and determines an optimum service (step d12). The user is informed of the result of the interpolating process (step d13). It is determined whether the user accepts the calling service process obtained by the interpolating process and if so, the calling service process is activated (step d11). If the user does not accept the calling service process obtained by the interpolating process, the process waits for the next event.

Figure 7:
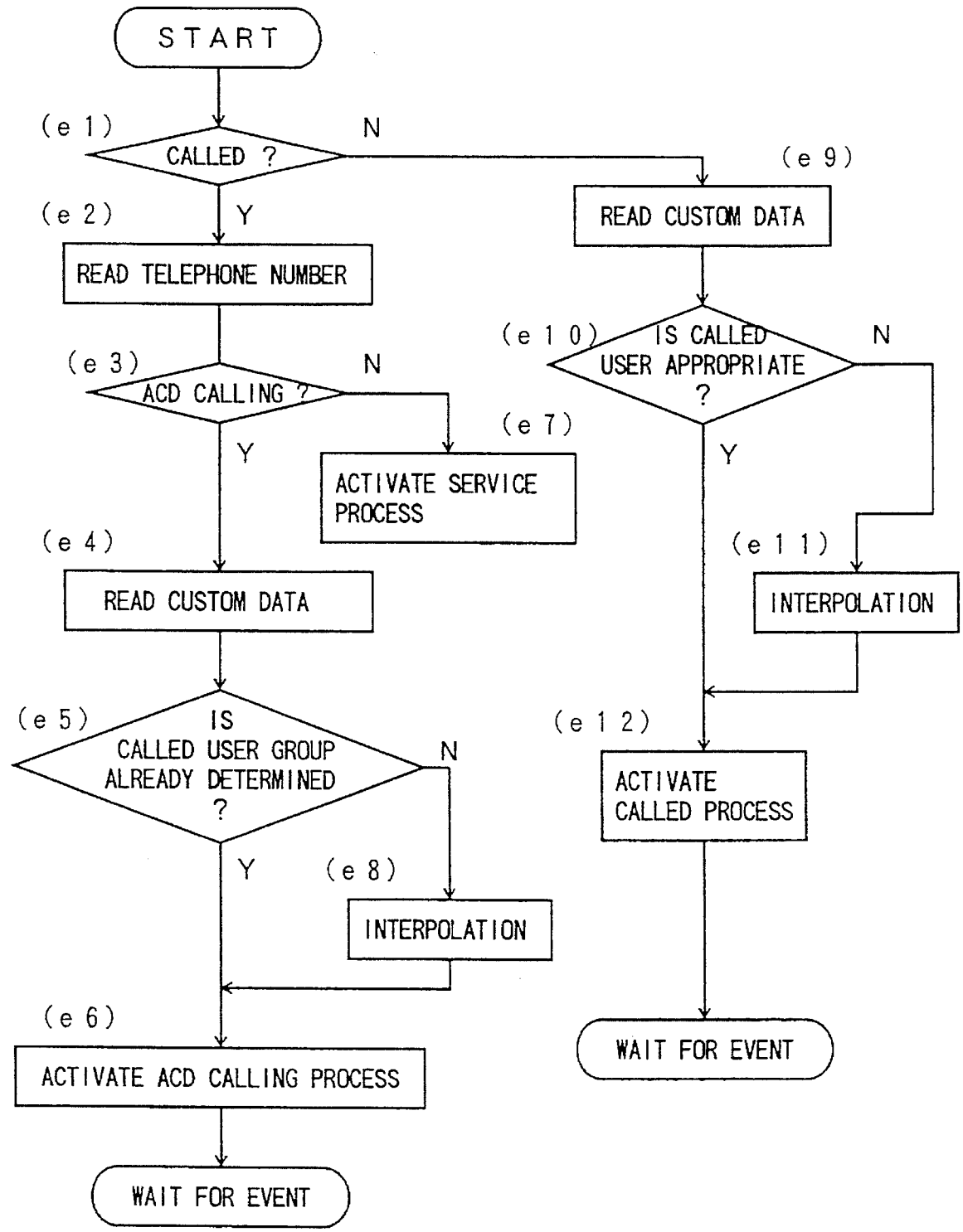
FIG. 7 is a flowchart of a program for realizing an ACD system.

FIG. 7 is a flowchart of the ACD program 16 (FIG. 2) according to the embodiment of the present invention. The ACD service program 16 automatically distributes outgoing calls from the users connected to the exchange 2 (FIG. 1) in order to prevent concentration of outgoing calls. First of all, it is determined whether or not an outgoing call has been received (step e1). When an outgoing call has been received, the telephone number of the caller is accessed (step e2) and it is determined whether or not the received outgoing call is an ACD call (step e3). When the received outgoing call is not an ACD call, a normal calling service process is activated (step e7). When the received outgoing call is an ACD call, custom data is read from the custom database 20 under the control of the service program interpreter 19 (step e4) as in the case of the aforementioned processes. Then, it is determined whether a called user group at which the call should terminate has already been determined (step e5). When a called user group at which the call should terminate is determined by referring to the read custom data, an ACD calling process is activated (step e6). If the custom data registered in the database 20 does not have a sufficient contents, and therefore a called user group cannot be determined, the custom data interpolation processing unit 21 refers to the knowledge base 22 for interpolating custom data, and executes an interpolating process for determining a called user group (step e8). Then, the processing unit 21 activates the ACD calling process on the basis of the result of the interpolating process (step e6).

When the result of the step e1 determination is NO, that is, when an incoming call addressed to one of the users connected to the exchange 1 (FIG. 1) is received, custom data is read from the custom database 20 (step e9), and it is determined whether or not the incoming call is addressed to an appropriate destination (step e10). When the result of the above determination is YES, a called process is activated (step e12). When the result of the above determination is NO, the custom data interpolation processing unit 21 refers to the knowledge base 22 for interpolating custom data and executes an interpolating process for determining a called user group (step e11), and activates the called process on the basis of the result of the interpolating process (step e12).

Figure 8:
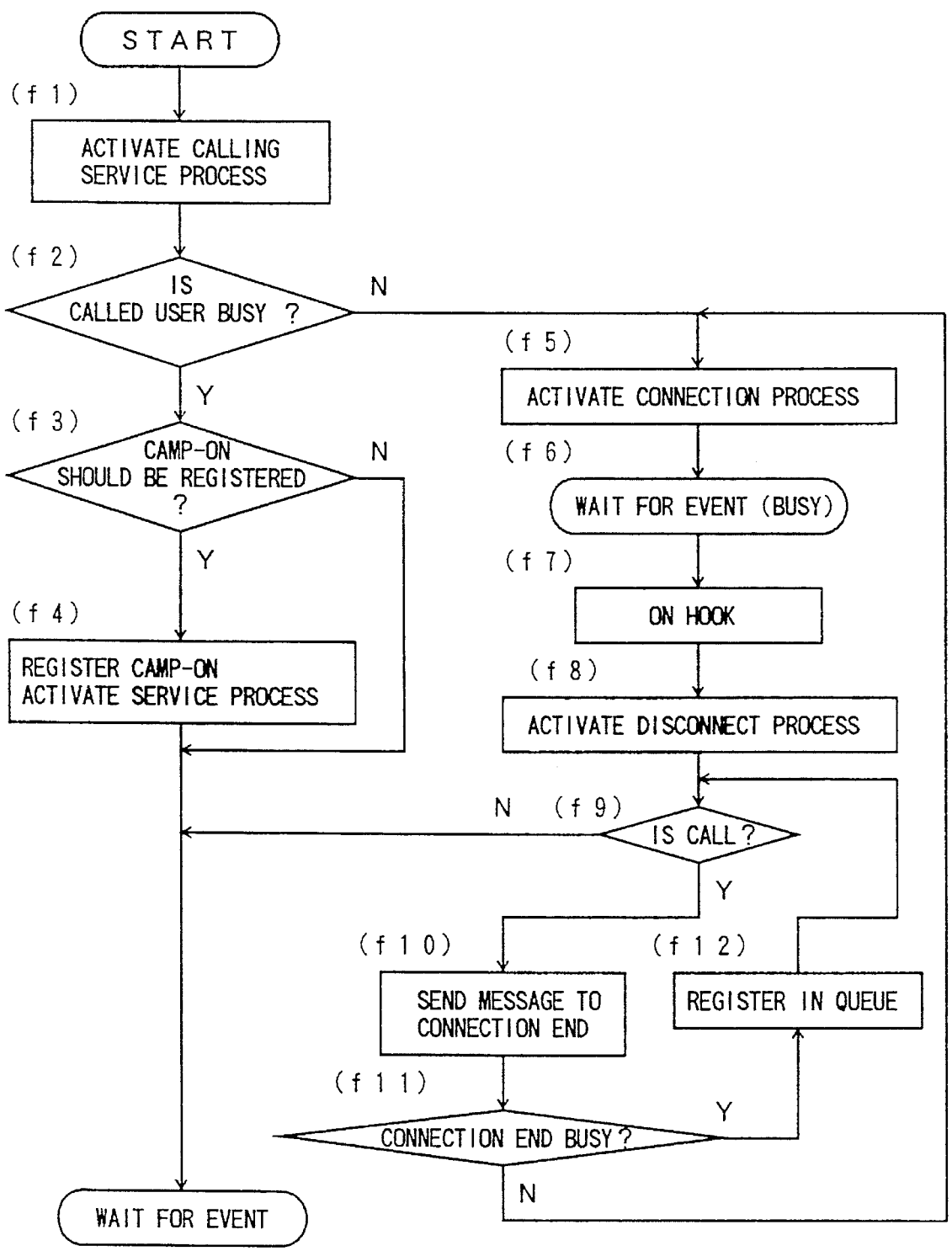
FIG. 8 is a flowchart of a program for realizing a multi camp-on system.

FIG. 8 is a flowchart of the aforementioned multi camp-on program 15 (FIG. 2) according to the embodiment of the present invention. In response to off-hook, the calling service process is activated (step f1). Then it is determined whether or not the called user is busy (step f2). When it is determined that the called user is busy, it is determined whether or not a camp-on registration should be carried out (step f3). When it is determined that the camp-on registration should be carried out, a camp-on registration service process is activated (step f4). Then, the programs waits for the next event.

When it is determined that the called user is not busy, a connection process is activated (step f5), so that the calling user and the called user are connected to each other. Then, the program waits for the event in the communicating state (step f6). In response to on-hook after the completion of communications (step f7), a disconnect process is activated (step f8), and the called user is disconnected from the line. Then it is determined whether or not there is a standby call in a queue (step f9). When it is determined that there is no standby call, the program waits for the next event. When it is determined that a standby call exists in the queue, a message for obtaining the communications state of the destination user is sent out (step f10). Then it is determined whether or not the destination user is busy (step f11). When the result of the above determination is YES, the call is registered in the queue related to the above destination user (step f12), and step f9 is executed. When it is determined that the destination user is not busy, step f5 is executed.

If corresponding custom data cannot be detected in the multi camp-on system, the custom data interpolation processor 21 executes an interpolating process. When there is a conflict between custom data on the camp-on registering side and custom data on the camp-on registered side, the conflict resolving processing unit 25 executes a conflict resolving process.

FIG. 9 shows examples of the custom data and a knowledge base. The custom data base 20 stores service instruction data shown in (A) of FIG. 9, and schedule data shown in (B) of FIG. 9. The service instruction data and the schedule data are custom data. The knowledge base shown in (C) of FIG. 9 functions as both the knowledge bases 18 and 22. If the user wishes to register custom data showing that a call from user C should be relayed to a his or her destination when the user is absent between 10:00 and 12:00, the custom data registration support processing unit 17 refers to the knowledge base shown in (C) of FIG. 9, and determines whether or not the custom data requested to be registered is appropriate (see step s2 shown in FIG. 3).

As shown in (B) of FIG. 9, the user is in the meeting room between 10:00 and 12:00. According to the knowledge base shown in (C) of FIG. 9, the user C is an ordinary caller which is not provided with important services, and a message from the user C is received by a mail device. Hence, the custom data registration support processing unit 17 provides the user with an alternative to the custom data requested to be registered showing that a call from the user C is received by the mail device during meeting (see step a4 in FIG. 3). If the user accepts the alternative, it is registered in the custom database 20 (steps a8 and a7 shown in FIG. 3).

If a call from user A is received between 10:00 and 12:00, the service program interpreter 19 understands that a service instruction to a call from the user A has not been registered in the custom database 20, and requests the custom data interpolation processing unit 21 to execute the corresponding interpolation process. The custom data interpolation processing unit 21 refers to the knowledge base shown in (C) of FIG. 9, and obtains information showing that the user A is an important caller. Further the processing unit 21 refers to the custom data shown in (B) of FIG. 9 and obtains information showing that the user is in the meeting room between 10:00 and 12:00. Then, the processing unit 21 transfers, to the service program interpreter 19, the result of the interpolating process showing that a call from the user A should be relayed to the meeting room. Thereby, the transfer service process is activated.

FIG. 10 shows examples of the custom data and knowledge data. FIG. 10-(A) shows an example of the knowledge base 26 for resolving a service conflict. If an interrupt request from user C who has registered a rejection service is generated while the user B is communicating with another user, the conflict detection processing unit 23 detects a conflict between the service instructions, and requests the conflict resolving processing unit 25 to resolve the conflict. Then, the conflict resolving processing unit 25 refers to the knowledge base 26 for resolving a conflict shown in (A) of FIG. 10, and proposes use of the voice mail service which is an alternative service.

FIG. 10-(B) shows an example of the custom data in the ACD system, and (C) and (D) of FIG. 10 show examples of the knowledge base 18 for supporting the registration process and the knowledge base 22 for interpolating custom data, respectively. When the user B wishes to register custom data showing that a call inquiring an ISDN (Integrated Services Digital Network) should be transferred to users E and F, the custom data registration support processing unit 17 refers to the knowledge base shown in (C) of FIG. 10, and understands that the above custom data is not appropriate. Then, the processing unit 17 provides the user B with an alternative service (custom data) showing that a relay of the call to the user E is impossible and it would be suitable for relaying the call to the users F and G. If the user B accepts the alternative, the custom data showing a call, inquiring the ISDN should be relayed to the users F and G, is registered in the custom database 20.

If an inquiry about a distribution process is received at the user B and a called user group at which the inquiry should terminate cannot be determined, the custom data interpolating processing unit 21 refers to the knowledge base shown in (C) of FIG. 10, and determines a group consisting of users D and E, taking into account traffic of calls to the user C. Then, the processing unit 23 activates the ACD called service process.

If the ACD service process requests the user B to receive a call and the user B terminates speech communications latest in the identical group, the conflict detection processing unit 23 detects the above fact, and refers to the knowledge base shown in (D) of FIG. 10. Further, the processing unit 23 takes into account traffic of calls to the user C, and determines a called user group consisting of users D and E. Then, the processing unit 23 activates the ACD called service process.

A case will now be considered where custom data shown in (A) of FIG. 11 is registered and a knowledge base shown in (B) of FIG. 11 functioning as both the knowledge bases 18 and 22 is used. If the user B wishes to register custom data showing that, when a camp-on registration request from the user A is received in state S1, this request should be queued in an FIFO (First-In First-Out) memory, the custom data registration support processing unit 17 refers to the knowledge base shown in (B) of FIG. 11, and understands that the requested custom data is inappropriate. Then, the processing unit 17 provides the user B with alternative custom data showing that a camp-on request from the user A which is an important caller should be registered at the top of the queue. If the user B accepts the alternative custom data, it is registered in the custom database 20.

The present invention can be applied to various service systems other than the aforementioned intelligent electronic secretary system, the ACD system and the multi camp-on system. In short, pieces of custom data from the users are registered. A service process is activated based on the registered custom data in response to a service execution request. If the content of the registered custom data is incomplete or inappropriate, custom data is interpolated by referring to the knowledge bases, and an appropriate service process is activated. If services are requested so that a conflict will occur, such a conflict is detected and resolved. Hence, it is easy to register various pieces of custom data and provide fine communications services by referring to the knowledge bases.

Figure 12:
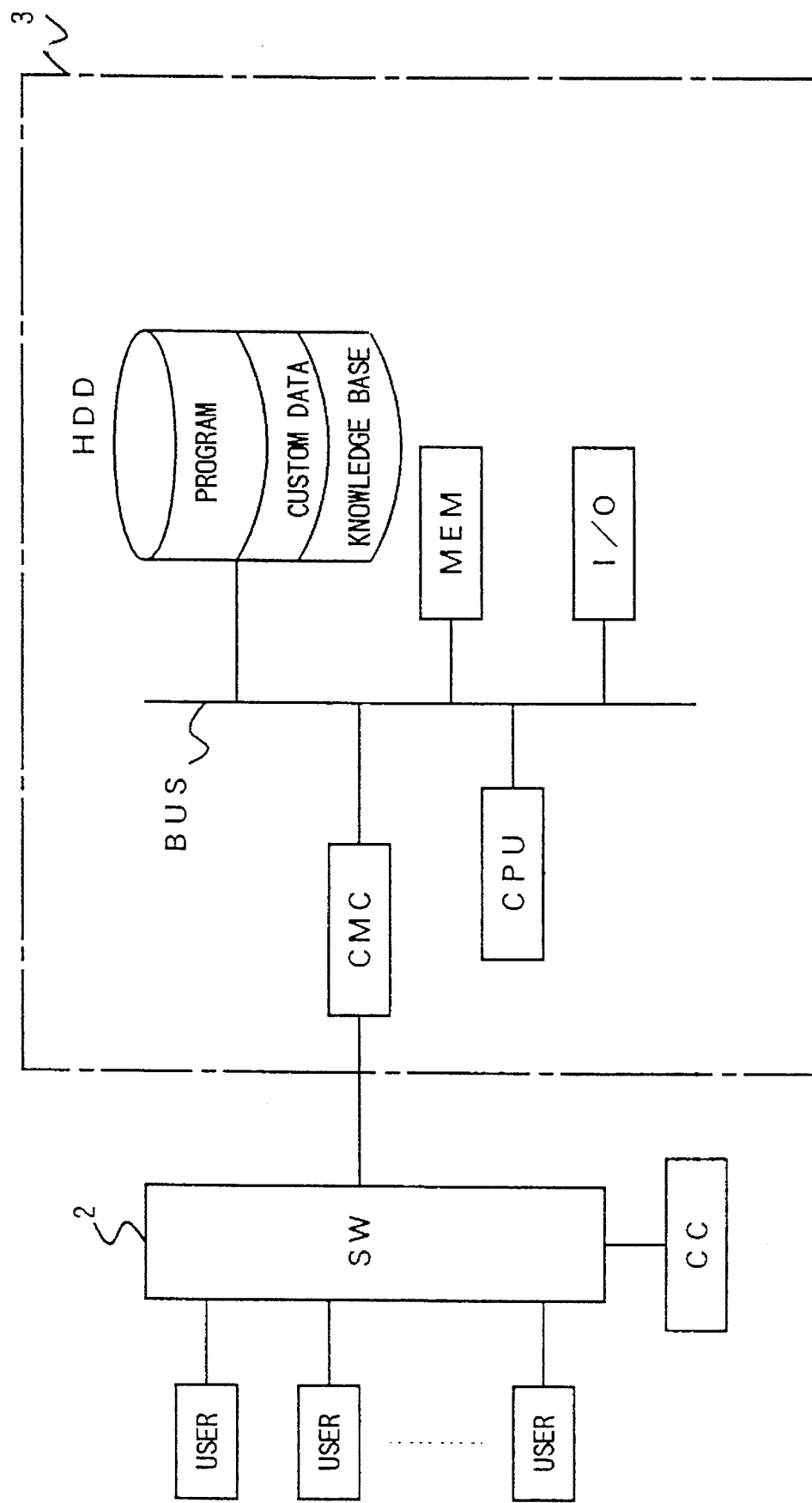
FIG. 12 is a block diagram of the hardware structure of the embodiment of the present invention.

FIG. 12 is a block diagram of the hardware structure of the embodiment of the present invention. In FIG. 12, parts that are the same as parts shown in the previously described figures are given the same reference numerals. The exchange 2 comprises a switch SW and a controller CC in a conventional manner. The computer comprises a communication controller CMC, a CPU, a memory MEM, a hard disk drive HDD, an input/output device I/O and a bus BUS.

The present invention is not limited to the specifically disclosed embodiment, and variations and modifications may be made without departing from the scope of the present invention.

What is claimed is:

1. A custom service control system connected to a communication system including a plurality of user terminals and an exchange, in which a request from a user terminal is execution of a service, said service being a basic process necessary to perform a service program registered in a service management process, and said service comprises program parts of an executed service program, said custom service control system comprising:

first memory means for storing service management processes respectively provided for the user terminals, wherein said service management processes can execute a process;

second memory means for storing a plurality of service processes respectively providing communication services, said service management processes comprising pieces of custom data showing service processes respectively usable by the user terminals; and control means, coupled to said first and second memory means, for selecting the service processes in response to requests from the user terminals in accordance with the service management processes, such that when a service management process executes a service, the control means selects service processes necessary to execute the requested service and then executes the requested service.

2. A custom service control system as claimed in claim 1, further comprising custom data registration means, provided for each of the service processes, for receiving custom data sent from the user terminals and writing the custom data into the second memory.

3. A custom service control system as claimed in claim 2, further comprising:

third memory means for storing a knowledge base showing information concerning the user terminals; and determining means, coupled to said custom data registration means and said third memory means, for determining whether or not the custom data sent from the user terminals has an error by referring to the knowledge base stored in the third memory means.

4. A custom service control system as claimed in claim 3, further comprising interpolation means, coupled to said custom data registration means and said third memory means, for interpolating, by referring to the knowledge base, the custom data sent from the user terminals to thereby generate appropriate custom data and for controlling said custom data registration means so that the appropriate custom data is written into said second memory means in lieu of the custom data sent from the user terminals.

5. A custom service control system as claimed in claim 1, further comprising third memory means for storing a knowledge base showing information concerning the user terminals, wherein said control means comprises means for selecting optimum service processes from among the plurality of service processes by referring to the knowledge base when the terminal users request execution of services which are not registered in the pieces of custom data respectively defined for the user terminals.

6. A custom service control system as claimed in claim 2, further comprising:

third memory means for storing a knowledge base showing information concerning the user terminals;

conflict detecting means for detecting a conflict between services requested by the user terminals by referring to the knowledge base stored in the third memory; and conflict resolving means, coupled to said conflict detecting means, for resolving the conflict.

* * * * *